United States Patent [19]

Angstadt et al.

[11] Patent Number: 4,743,385

[45] Date of Patent: May 10, 1988

[54] OIL RECOVERY AGENT

[75] Inventors: Howard P. Angstadt, Media, Pa.; Donald F. Rugen, Wilmington, Del.; John L. Cayias, Richardson, Tex.

[73] Assignee: Sun Refining and Marketing Company, Philadelphia, Pa.

[21] Appl. No.: 830,608

[22] Filed: Feb. 18, 1986

Related U.S. Application Data

[63] Continuation-in-part of Ser. No. 673,814, Nov. 21, 1984, abandoned, which is a continuation-in-part of Ser. No. 564,545, Dec. 22, 1983, abandoned.

[51] Int. Cl.$^4$ ............................................. E21B 43/22
[52] U.S. Cl. .................................. 252/8.554; 166/272
[58] Field of Search ....................... 252/8.55 D, 8.554; 166/272, 274, 275, 303

[56] References Cited

U.S. PATENT DOCUMENTS

| | | | |
|---|---|---|---|
| 3,302,713 | 2/1967 | Ahearn . | |
| 3,348,611 | 10/1967 | Reisberg . | |
| 3,357,487 | 12/1967 | Gilchrist et al. . | |
| 3,501,409 | 3/1970 | Matson et al. | 252/137 |
| 3,874,454 | 4/1975 | Clark et al. | 166/270 |
| 3,878,894 | 4/1975 | Clark et al. | 166/270 |
| 3,885,626 | 5/1975 | Gale et al. | 166/273 |
| 3,933,201 | 1/1976 | Kerfoot et al. | 252/8.55 X |
| 3,994,345 | 11/1976 | Needham | 166/303 |
| 4,148,736 | 4/1979 | Meister | 252/8.55 R |
| 4,187,185 | 2/1980 | Park et al. | 252/8.55 |
| 4,203,853 | 5/1980 | Allen | 252/352 X |
| 4,513,820 | 4/1985 | Maddox | 252/8.55 X |
| 4,556,107 | 12/1985 | Duerksen et al. | 166/272 |

OTHER PUBLICATIONS

Davidsohn et al., "Synthetic Detergents", Wiley, 6th ed., pp. 79–80.

Primary Examiner—Herbert B. Guynn
Attorney, Agent, or Firm—J. Edward Hess; Donald R. Johnson

[57] ABSTRACT

There is provided herein a process and composition for the enhanced recovery of oil from subterranean formations comprising injecting in combination with steam a composition comprising (a) an anionic surfactant and (b) a hydrotrope.

4 Claims, No Drawings

OIL RECOVERY AGENT

CROSS-REFERENCE TO RELATED CASES

This application is a continuation-in-part of U.S. application Ser. No. 673,814, filed Nov. 21, 1984, which in turn is a continuation-in-part of U.S. application Ser. No. 564,545, filed Dec. 22, 1983, both now abandoned in the names of Angstadt et al, and entitled "Oil Recovery Agent".

BACKGROUND OF THE INVENTION

1. Field of the Invention

This invention relates to novel surfactant compositions and methods of using the same to enhance the recovery of oil from subterranean formations. More particularly, this invention comprises injecting novel combinations of anionic surfactants and hydrotropes with steam into oil-bearing formations to greatly increase heavy oil recovery as compared with the use of steam alone.

2. Description of the Prior Art

The use of secondary and tertiary oil recovery techniques, with or without the addition of various reagents such as surfactants, water thickeners and the like to recover crude oil left behind in formations after the "primary" oil has been withdrawn is well established in the art. These displacement methods have been improved by the addition of surfactant compositions in both secondary and tertiary processes, for example where a formation has already been waterflooded at least once.

Representative of these prior art compositions and methods are those taught in U.S. Pat. Nos. 3,348,611 to Reisburg; 3,885,626 to Gale et al; 3,901,317, to Plummer et al; 3,994,342 to Healy et al; and 4,295,980 to Motz, all of which teach aqueous flooding techniques with at least one surfactant, and in some cases, with viscosity modifiers, co-surfactants or the like. In an unrelated field, U.S. Pat. No. 3,501,409 teaches a liquid washing detergent composition comprising said detergent in combination with a hydrotrope.. Similarly, U.S. Pat. No. 4,165,294 teaches a commercial photoresist stripping solution comprising an alkyl aryl sulfonic acid and a hydrotrope aromatic sulfonic acid. This composition, used to remove organic coatings from inorganic subtrates, is further characterized in requiring the presence of a solvent, and also requiring that the composition must be phenol-free and halogen-free. Finally, U.S. Pat. No. 3,354,091 discloses a heavy-duty liquid detergent consisting essentially of a 5-component composition requiring the presence of an alkali metal anionic surfactant, a polyphosphate salt, a hydrotrope, carboxymethylcellulose, and hydrogenated castor oil. Optionally, small amounts of sodium silicate may, for undisclosed reasons, be added as long as it does not adversely affect the desired results of the composition.

In addition to the aforedescribed aqueous flooding techniques, the art has also employed steam for tertiary oil recovery, utilizing the effect of heat to obtain heavy oil from the formations in which it is found. See, for example, U.S. Pat. Nos. 3,357,487 and 3,994,345. However, the mechanism and effects of surfactants under these high temperatures and diverse formation conditions remain unclear, and thus make it impossible to predict from a knowledge of the effects of aqueous surfactant systems which surfactants, if any, can advantageously be employed in these steam recovery conditions. This is even more true in the choice of any modifiers which might enhance the effectiveness of the surfactant.

It is, therefore, an object of this invention to provide a novel surfactant composition useful for enhancing steam recovery processes for tertiary recovery of heavy oil from subterranean formations, as compared with the use of steam alone.

It is a further object of this invention to provide an improved steam recovery process for enhanced oil recovery, utilizing the novel compositions provided herein.

Further objects and advantages of the compositions and methods of the present invention will become apparent in the course of the following detailed description thereof.

SUMMARY OF THE INVENTION

In accordance with the present invention, there is provided herein a novel surfactant composition useful in steam recovery processes for the enhanced recovery of crude oil from subterranean reservoirs comprising (1) an anionic surfactant and (2) a hydrotrope, wherein the anionic surfactant is preferably selected from the group consisting of long chain alkyl aryl sulfonates, petroleum sulfonates, and olefin sulfonates, including derivatives of said olefin sulfonates such as ether sulfonates, ethoxylated sulfonates and propoxylated sulfonates. The hydrotropes, as described in further detail hereinbelow, are also sulfonated compounds, but they differ from the surfactants defined above in having a considerably lower molecular weight, being extremely water-soluble, having very short side chains, and performing poorly as surfactants.

As will be evident from the examples and following description, the novel composition and processes of this invention comprising said anionic surfactants and hydrotrope, when employed in a steam recovery process, exhibit unexpected benefits over what would be expected from the combined effects of each component, i.e., a synergistic effect as compared with the results of steam alone. For instance, in Example 9 the percent increased recovery over steam alone was 55%, while the percent increased recovery of the individual components, added together, totals only 26%. As further discussed below, since a hydrotrope by definition is a compound which increases the solubility of a surfactant in water, the enhanced effect disclosed herein is particularly surprising because it would normally be supposed that the hydrotrope would increase the solubility of the surfactant in the aqueous portion of the steam, and decrease its solubility in the oil phase, thus rendering it less effective in oil recovery.

Moreover, apart from the mechanism of the hydrotrope, steam recovery systems themselves differ from water recovery systems in many ways. Thus, for example, steam is present in a gas phase, which itself provides different oil recovery mechanisms than does water. Also, since it is in a gas phase, the steam has considerably faster flow rates, allowing physical effects such as aspiration to occur. Further, condensation of the steam allows for much greater and more efficient heat transfer to the formation and the oil, so that the whole system can be heated hotter and faster than with water. Since the steam is hotter and less viscous than water, it can reach parts of the reservoir which are inaccessible to water. Also, steam can effect distillation of lighter fractions of crude oil, producing unpredictable effects. Finally, steam can move heavy oils, which have different compositions from light oils moved by water, also with different effects. Thus, it will be seen that as between steams and water recovery systems, significant differences exist, the results of which are unpredictable from one system to the other.

DESCRIPTION OF THE PREFERRED EMBODIMENTS

Amongst the anionic surfactants useful in the compositions and processes of this invention, one preferred embodiment comprises an alkyl aryl sulfonate having at least one long chain alkyl group containing from about 12 to 30 carbon atoms, and optionally a short chain alkly group containing from about 1 to 4 carbon atoms, i.e. a dialkyl aryl sulfonate. Thus, examples of the aryl nucleus to be alkylated with a long chain alkyl group include not only benzene but such lower alkyl-substituted aryl compounds as toluene or ethylbenzene or mixtures thereof. Generally, these alkyl aryl compounds, because of their high heat stability in a steam environment, are preferred.

By the term "long chain alkyl" is meant that at least one alkyl moiety of the alkyl aromatic sulfonate, which alkyl moiety may be branched or straight-chain, should desirably contain from about 12 to 30 carbon atoms, and most preferably an average of about 14 to 20 carbon atoms. The term "average" is meant to signify that the alkyl moiety may be derived from mixtures of hydrocarbons having a weighted average of from about 14 to 20 carbon atoms, even though somewhat shorter or longer chain lengths may be present in the mixture. Thus, in one preferred embodiment of the invention, the alkyl moiety may be derived from a mixed $C_{14-20}$ $\alpha$-olefin source in which the molecular weight distribution is such that the resultant alkyl side chain has an average of about 16 carbon atoms, even though lesser amounts of somewhat shorter or longer chain lengths may be present in the alkylated product.

One preferred alkylate, having an average number of about 16.2 carbon atoms in the side chain, may be derived from a wax-cracked $C_{14-18}$ olefin having the following weight distribution:

| Carbon Atoms in Side Chain | Weight Distribution (%) |
|---|---|
| $C_{14}$ | 2 |
| $C_{15}$ | 30 |
| $C_{16}$ | 30 |
| $C_{17}$ | 28 |
| $C_{18}$ | 10 |

Alternatively, the alkylate may be prepared from a $C_{14-18}$ mixture derived from the polymerization of ethylene in a known manner, wherein the average alkyl group contains 16.0 carbon atoms, and wherein the mixture is further characterized by alkyl groups having even-numbered carbon atoms only. A typical weight distribution of such mixture is as follows:

| Carbon Atoms in Side Chain | Weight Distribution (%) |
|---|---|
| $C_{14}$ | 25 |
| $C_{16}$ | 50 |
| $C_{18}$ | 25 |

Alternatively, the long chain alkyl group may be derived from the oligomerization of propylene by known processes, as for example using phosphoric acid as the catalyst, or the like, wherein the side-chain may be either a single carbon number species which is a multiple of $C_3$, i.e. $C_{12}$, $C_{15}$, $C_{18}$, or $C_{21}$, or a blend of these branched oligomers, such that the average molecular weight of the side chain is in the $C_{15-18}$ range.

In place of the alkyl aryl sulfonates there may be employed as the anionic surfactant in the compositions of this invention petroleum sulfonates. The petroleum sulfonates encompass a broad range of compounds which are well known in the art, and which are generally obtained by the sulfonation of naturally occurring petroleum streams derived from crude oil. Typical of this broad range are those petroleum sulfonates described in U.S. Pat. No. 3,302,713; 3,508,612; 3,648,772; and 3,901,317, all of which are incorporated herein by reference.

Thus, the term "natural petroleum sulfonates" is a commercial designation of petroleum sulfonates which are obtained by a treatment of petroleum fractions, particularly solvent-treated aromatic fractions, with, for example, sulfuric acid, fuming sulfuric acid, or sulfur trioxide. Upon sulfonation two types of general products are thereby formed which are known in the art as mahogany acid sulfonates and green acid sulfonates, respectively, based on their color and solubility in oil or water.

A third type of anionic surfactant which may be used in the compositions disclosed herein are, as mentioned above, olefin sulfonates which are generally commercially available materials, as for example those obtained from olefins made by the "SHOP" process available from Shell Oil Co. Typically, these olefins may have the following structures: $R-CH=CH-R_1$, $R-CH=CH_2$, or

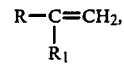

$$R-C=CH_2,$$
$$|$$
$$R_1$$

wherein R and $R_1$ may be hydrogen, or alkyl groups having from 8-28 carbon atoms, and may be he same or different. Preferred amongst these are those alkyl groups having from about 10 to 16 carbon atoms. While the methods for preparing these compounds are generally well known, the olefin sulfonates may best be described as the sulfonation products of wax-cracked hydrocarbons having from about 12 to 30 carbon atoms, or alternatively of ethylene oligomers, e.g., those obtained by Ziegler-type polymerizations and having from about 12 to 30 carbon atoms. Also contemplated within the scope of the invention are known derivatives of said olefin sulfonates such as ether sulfonates; ethoxylated sulfonates; or proproxylate sulfonates. In general, these compounds may be prepared by well-known procedures.

The preparation of the anionic surfactants, i.e., the alkylation and sulfonation of the aromatic moiety, or the preparation of the olefin or petroleum sulfonates, are conventional techniques well known in the art which need not be described further herein in detail. For example, the alkylated hydrocarbons may be sulfonated in the usual way, using $SO_3$ in a falling film reaction, or with oleum, or the like. It is preferred, though not essential, that the sulfonates be employed in the form of their alkali metal salts.

The second component of the novel composition claimed herein, to be used in combination with the anionic surfactants, is a hydrotrope, i.e., those compounds characterized in the art by their ability to increase the solubility of surfactants in aqueous system. See, for example, the description in "Synthetic Detergents", Davidsohn et al, 6th Ed., Wiley and Sons, pages 79, 80. Included amongst these compounds are both aryl and non-aryl compounds. The aryl compounds are generally aryl sulfonates or short-chain alkyl aryl sulfonates in the form of their alkali metal salts, in which there may be present from 1 to 3 alkyl groups, each containing from 1 to about 3 carbon atoms, in which the aryl component may be benzene, or such alkyl-substituted aryl compounds as toluene, xylene, or cumene, or naphthalene. Included amongst these aryl hydrotropes are such preferred compounds as sodium xylene sulfonate, sodium toluene sulfonate, sodium benzene sulfonate, and the like. Non-aryl hydrotropes which may likewise be satisfactorily employed include such compounds as sodium isethionate, butane sulfonate, hexane sulfonate, and the like, i.e. sulfonates whose alkylmoiety contains from about 1 to 8 carbon atoms.

The mechanism by which these hydrotropes operate to enhance steamdriven surfactant systems in an essentially non-aqueous liquid oil environment is not known. As stated above, since hydrotropes increase the solubility of surfactants in water, it should render them less effective in oil recovery for the reasons stated. However, as will be shown in the examples below, when a hydrotrope is combined with e.g., a $C_{14-18}$ alkyl aryl sulfonate, a significant increase in oil recovery results over the added effects of the two components alone.

The weight ratio of the anionic surfactant to hydrotrope in the composition of this invention is desirably from about 1:0.05 to 0.5:2.0, and preferably about 1:0.1 to 1:1, most preferably 1:0.5, although this amount may be varied considerably, depending upon the properties of the oil field being treated, as well as the nature of the selected hydrotrope, and the nature of the resulting composition. This mixture is desirably dissolved in water in order to prepare an easily-handled solution to add to the steam to be injected into the underground formation. Thus, for example, one preparation representing a preferred composition ready to be added to steam comprises 25% by weight of hexadecyltoluene sulfonate; 17% sodium xylene sulfonate, and the balance water.

In addition to the two major components of the composition there may be optionally be included minor amounts of materials such as known stabilizers, bacteriostats, low temperature additives, e.g. ethylene glycol, antioxidants, and the like. These materials, alone or in combination, may be added in amounts of up to 10-15% by weight of the total surfactant composition to the extent that they do not adversely affect the properties of the compositions for the use for which they are intended.

As described above, the surfactant system of this invention is desirably injected into the subterranean formations admixed in steam, in which the steam recovery process may be carried out either as a cyclic process or a steam drive process, and the heavy crude oil recovered in a generally well-known manner. Thus, in a typical cyclic steam process, oil is produced from the same well from which the steam was previously added, while in a typical steam drive process the oil production well is remote from the steam injection well.

The amount of the surfactant-hydrotrope composition of this invention admixed with the steam may vary widely according to the characteristics of the formation, and is not critical, but desirably the height of the surfactant portion of the composition in the steam should be in the range of from about 0.1 to 10 wt. %, and preferably about 0.5-5 wt. %, based on the weight of the water equivalent of the steam. This concentration, in turn, may be achieved by metering the composition into the steam from a more concentrated solution, as described above. In practice, the process of this invention may be applied equally to steam drive processes among multiple wells or to a cyclic process involving an individual well.

The compositions and methods of this invention will now be illustrated by reference to the following examples, which are presented by way of illustration only and not by way of limitation on the scope of the invention.

EXAMPLES

In the following examples the method used to evaluate the usefulness of the composition comprised packing a tube having a diameter of 2" and a length of 18" with oil-saturated No. 140 mesh Ottowa sand. The water-wet sand was coated with Midway Sunset crude oil to between 60-65% residual oil saturation. The top 15% of the tube was filled with clean sand to simulate a zone of high permeability frequently found in steam reservoirs. The tube was insulated to reduce heat losses, and then either a 40-50% quality steam alone, i.e. that proportion of the water in vapor form or a 40-50% quality steam in combination with various surfactant systems was passedd through the sand pack in concentrations of 1 weight percent surfactant based on the water equivalent of the steam at appropriate rates until no more oil was evident exiting from the apparatus. The amount of oil recovered was measured in one or both of two ways: (1) total liquid oil obtained from the pack; or (2) the oil remaining on the sand at the end of the experiment was determined, and the amount recovered calculated as the difference from the value determined to be on the sand at the start of the experiment. The percent of oil recovered based on the amount of oil originally in place in the pack, is summarized in Table I below.

In the following examples, Examples 1 to 7 are comparative, while Examples 8 to 13 illustrate the composition and method of this invention.

It will be seen from the results of these examples that not only is there a very substantial increase of almost 55% in oil recovery utilizing the surfactant system of this invention (Examples 8 to 13) as compared with the use of steam alone (Example 1), and as much as a 46% greater oil recovery than with various prior art surfactants alone having alkyl chain lengths averaging less than 16 (Examples 2, 3 and 4 ), but also there is an equally significant improvement shown when the effects of the individual components of the composition (Examples 5, 6 and 7) are compared with the results demonstrated in the aforementioned Examples 8 to 13.

EXAMPLE 1

Employing the general procedures described above, and passing steam alone through a sandpack containing the Midway Sunset oil, in a series of runs an average 44.5% of this oil was recovered.

EXAMPLE 2

Employing the procedures of Example 1, but adding to the steam 9.24 cc. (100% surfactant-active basis) of an α-olefin sulfonate diluted such that final concentration was 1% by weight in the steam (based o the water equivalent), 48.4% of original oil in place was recovered, i.e., an increase of 9% based upon the recovery obtained by steam alone.

The α-olefin sulfonate was a sulfonated $C_{12\text{-}16}$ α-olefin prepared from a mixture of α-olefins whose carbon chain lengths are $C_{12}$, $C_{14}$, and $C_{16}$, wherein the olefin has an average of 14 carbon atoms.

EXAMPLE 3

Employing the procedures of Example 1, but adding to the steam 9.24 cc. (100% surfactant-active basis) of a $C_{12\text{-}14}$ alkyltoluene sulfonate diluted such that the final concentration was 1% by weight in the steam (based on the water equivalent), 49.6% of the original oil in place was recovered, i.e., an increase of 12% based upon the recovery obtained by steam alone.

The alkylate used in the preparation of the surfactant was derived from a wax-cracked $C_{12\text{-}14}$ α-olefin having an average of 12.8 carbon atoms.

EXAMPLE 4

Employing the procedures of Example 1, but adding to the steam 9.24 cc (100% surfactant-active basis) of a $C_{10\text{-}18}$ alkyltoluene sulfonate diluted such that the final concentration was 1% by weight in the steam (based on the water equivalent), 58.4% of the original oil in place was recovered, i.e., an increase of 31% based upon the recovery obtained by steam alone.

The alkylate used in the preparaton of the surfactant was derived from a $C_{10}$-$C_{18}$ α-olefin prepared by the polymerization of ethylene; this mixture, consisting of even-numbered carbon chains only, had an average of 14.0 carbon atoms.

EXAMPLE 5

Employing the procedures of Example 1, but adding to the steam 9.24 cc. (100% surfactant-active basis) of a $C_{14\text{-}18}$ alkyltoluene sulfonate diluted such that the final concentration was 1% by weight in the steam (based on the water equivalent), in two runs an average of 57.4% of the original oil in place was recovered, i.e., an increase of 29% based upon the recovery obtained by steam alone.

The alkylate used in the preparation of the surfactant was derived from a wax-cracked $C_{14\text{-}18}$ α-olefin having an average of 16.2 carbon atoms.

EXAMPLE 6

Employing the procedures of Example 1, but adding to the steam 9.24 cc (100% surfactant-active basis) of a $C_{14\text{-}18}$ alkyltoluene sulfonate diluted such that the final concentration was 1% by weight in the steam (based on the water equivalent), 53.5% of the original oil in place was recovered, i.e., an increase of 20% based upon the recovery obtained by steam alone.

The alkylate used in the preparation of the surfactant was derived from a moisture consisting of even-numbered carbon chains only, a $C_{14\text{-}18}$ α-olefin obtained from the polymerization of ethylene and had an average 16.0 carbon atoms.

EXAMPLE 7

Employing the procedures of Example 1, but adding to the steam 9.24 cc. (100% surfactant-active basis) of sodium xylene sulfonate diluted such that the final concentration was 1% by weight in the steam (based on the water equivalent), 47.0% of the original oil in place was recovered, i.e., an increase of 6% based upon the recovery obtained by steam alone.

EXAMPLE 8

The procedure of Example 1 were employed, but the $C_{14\text{-}18}$ alkyl toluene sulfonate of Example 5 was used in combination with the sodium xylene sulfonate of Example 7 in a 1:1 molar ratio, i.e., 9.24 cc of the alkyl toluene sulfonate (100% surfactant-active basis) was mixed with an equivalent molar amount of the sodium xylene sulfonate hydrorope. This mixture was diluted to provide a final concentration in the steam (based on the water equivalent) of 1% by weight based on the surfactant. When added to the steam, 67.3% of the original oil in place was recovered, i.e., an increase of 51% based upon the recovery obtained by steam above.

EXAMPLE 9

In accordance with the same procedures used in Example 8, but using instead $C_{14\text{-}18}$ alkyl toluene sufonate of Example 6 in combination with the sodium xylene sulfonate of Example 7 in the same 1:1 molar ratio, 69% of the original oil in place was recovered, i.e., an increase of 55% based upon the recovery obtained by steam alone.

EXAMPLE 10

In accordance with the procedures of Example 8, but substituting sodium toluene sulfonate for sodium xylene sulfonate, 67.5% of the original oil in place was recovered, i.e., an increase of 52% based upon the recovery obtained by steam alone.

EXAMPLE 11

In accordance with the procedures of Example 8, but substituting sodium cumene sulfonate for sodium xylene sulfonate, 68.4% of the original oil in place was recovered, i.e., an increase of 54% based upon the recovery obtained by steam alone.

EXAMPLE 12

Employing the procedures of Example 8, but adding for purposes of low temperature application, 4% of ethylene glycol to the surfactanthydrotrope system of Example 9, and adding this combination to the steam, 68.1% of the original oil in place was recovered, i.e., an increase of 52% based upon the recovery obtained by steam alone.

EXAMPLE 13

Employing the α-olefin of Example 2 in combination with sodium xylene sulfonate in accordance with the procedures of Example 8, there was recovered 66.8% of the original oil in place, i.e., an increase of 50% based upon the recovery obtained by the use of steam alone.

The percentage yields of recovered oil shown in the above examples and percent improvement over steam alone are summarized as follows:

TABLE I

| Example | Surfactant Composition | Oil Recovered (% OOIP)[1] | Oil Recovered (% Improvement)[2] |
|---|---|---|---|
| 1 | Steam Alone | 44.5 | — |
| 2 | $C_{12-16}$ α-olefin | 48.4 | 9 |
| 3 | $C_{12-14}$ Alkyltoluene Sulfonate | 49.6 | 12 |
| 4 | $C_{10-18}$ Alkyltoluene Sulfonate | 58.4 | 31 |
| 5 | $C_{14-18}$ Alkyltoluene Sulfonate | 57.4 | 29 |
| 6 | $C_{14-18}$ Alkyltoluene Sulfonate | 53.5 | 20 |
| 7 | Na Xylene Sulfonate | 47.0 | 6 |
| 8 | Ex. 5 + Ex. 7 Sulfonates | 67.3 | 51 |
| 9 | Ex. 6 + Ex. 7 Sulfonates | 69.0 | 55 |
| 10 | Ex. 6 + Na Toluene Sulfonate | 67.5 | 52 |
| 11 | Ex. 6 + Na Cumene Sulfonate | 68.4 | 54 |
| 12 | Ex. 9[3] + Ethylene Glycol | 67.5 | 52 |
| 13 | Ex. 2 + Na Xylene Sulfonate | 66.8 | 50 |

[1] OOIP = original oil in place
[2] Based Upon Steam Alone
[3] Includes Sodium Xylene Sulfonate

What we claim is:

1. An improved method for the enhanced recovery of oil from subterranean formations whereby steam is injected into said formations, the improvement comprising incorporating in the steam an effective amount of a mixture comprising about a 1:0.05–0.5:2.0 weight ratio of a $C_{14-20}$ alkyl toluene sulfonate, a $C_{14-20}$ ethylbenzene sulfonate, or a $C_{14-20}$ alkyl benzene sulfonate and a hydrotrope selected from the group consisting of alkali metal xylene sulfonates, alkali metal toluene sulfonates, alkali metal cumene sulfonates, alkali metal benzene sulfonates, alkali metal isethionantes, alkali metal butane sulfonates and alkali metal hexane sulfonates.

2. The process according to claim 1 wherein the alkyl moiety of the $C_{14-20}$ sulfonate has an average of about 16 carbon atoms.

3. An improved method for the enhanced recovery of oil from subterranean formations by the injection of steam into said formations, the improvement comprising incorporating in said steam an effective amount of a mixture comprising about a 1:0.05–0.5:2.0 weight ratio of a $C_{8-30}$-olefin sulfonate and a hydrotrope selected from the group consisting of alkali metal xylene sulfonates, alkali metal toluene sulfonates, alkali metal cumene sulfonates, alkali metal benzene sulfonates, alkali metal isethionates, alkali metal butane sulfonates and alkali metal hexane sulfonates.

4. The process according to claim 3 wherein the olefin has an average of about 16 carbon atoms.

* * * * *